(12) United States Patent
Yao (10) Patent No.: US 6,498,869 B1
(45) Date of Patent: Dec. 24, 2002

(54) DEVICES FOR DEPOLARIZING POLARIZED LIGHT

(76) Inventor: Xiaotian Steve Yao, 22520 Mountain Laurel Way, Diamond Bay, CA (US) 91765

( * ) Notice: Subject to any disclaimer, the term of this patent is extended or adjusted under 35 U.S.C. 154(b) by 0 days.

(21) Appl. No.: 09/332,662

(22) Filed: Jun. 14, 1999

(51) Int. Cl.$^7$ ................................. G02B 6/00
(52) U.S. Cl. ................................................ 385/11
(58) Field of Search ........................ 359/350, 497, 359/483; 356/350; 372/56, 75; 385/10–14, 147

(56) References Cited

U.S. PATENT DOCUMENTS

| | | | |
|---|---|---|---|
| 4,198,123 A | * 4/1980 | Kremen | 356/317 |
| 4,787,741 A | * 11/1988 | Udd et al. | 356/345 |
| 5,245,407 A | * 9/1993 | Nishiura et al. | 356/350 |
| 5,371,595 A | * 12/1994 | Nishiura et al. | 356/350 |
| 5,432,637 A | * 7/1995 | Hakimi | 359/497 |
| 5,526,115 A | * 6/1996 | Nishiura | 356/350 |
| 5,870,421 A | * 2/1999 | Dahm | 372/75 |

* cited by examiner

Primary Examiner—Akm E. Ullah
(74) Attorney, Agent, or Firm—Fish & Richardson P.C.

(57) ABSTRACT

Depolarizing system for polarized light formed of a birefringence crystal wedge which receives the beam of polarized light at a first surface and outputs spatially depolarized light from its output surface. The wedge may include small steps on one of the surfaces or special orientations to depolarize the light. The wedge may be substantially triangular in shape so that the surface decreases from one side to the other.

52 Claims, 4 Drawing Sheets

DEVICES FOR DEPOLARIZING POLARIZED LIGHT

FIELD OF INVENTION

This invention pertains generally to polarization control in fiber optic and free-space optical systems. Specifically the present invention relates to an optic apparatus for depolarizing polarized light in optical fibers and in free space.

DESCRIPTION OF RELATED ART

Many components in advanced fiber optic communication (T. Okoshi, "Recent Advances in Coherent Optical Fiber Communication Systems," J. Lightwave Technology, Vol. LT-5, No. 1, pp. 44–52, 1987) and sensing systems, such as interferometers and electro-optic modulators, are polarization sensitive. In order for these polarization sensitive devices to function properly, an input light's polarization state is precisely aligned with a particular axis of the devices. Unfortunately, the polarization state of light propagating in a length of standard circular fiber varies along the fiber due to random birefringnece induced by thermal stress, mechanical stress, and irregularities of the fiber core (I. P. Kaminov, "Polarization in Optical Fibers," IEEEE J. Quantum Electronics, Vol. QE-17, No. 1, pp. 1–22, 1981). Thus typically, a standard optic fiber outputs elliptically polarized light with varying degrees of ellipticity, and with the major elliptical axis at an arbitrary angle relative to a reference orientation.

One prior art method of solving the polarization problem utilizes polarization controllers. Polarization controllers, including tri-plate controllers, fiber tri-loop controllers, and the Yao controller (see Photonics Spectra, April issue, pp. xxx, 1998), typically convert an arbitrary polarization state into a desired polarization state. However, such polarization controllers cannot accommodate rapid polarization fluctuations in the fiber and therefore are unsuitable in systems where the polarization state fluctuates due to time dependent thermal or mechanical stresses on the fiber, or due to polarization fluctuations of the laser light itself.

Another method of solving the polarization fluctuation problem is to depolarize polarized light. One prior art m method of depolarizing light utilizes an electro-optic modulator to rapidly modulate the polarization state. However, the electro-optic modulator output is not truly depolarized. The output of the electro-optic modulator depolarizer only appears depolarized to an observer or detector having a response slower than the modulation speed. Another disadvantage of the electro-optic modulator depolarizer is high cost. Typical electro-optic modulator systems utilize a high frequency microwave signal source and an expensive electro-optic modulator. A third disadvantage of such an electro-optic depolarizer is the high loss, resulting from coupling between optical fibers and the waveguide in the electro-optical modulator.

A second prior art method for depolarizing light uses a recirculating fiber loop which includes a 2×2 fiber coupler with two input ports, 1 and 2, and two output ports, 3 and 4. ("Tunable single mode fiber depolarizer" by P. Shen, J. C, Palais, and C. Lin, Electronics Letters, Vol. 33, No. 12, pp. 1077–1078). The output port 4 is connected with input port 2 to form a recirculating loop. A first polarization controller is placed at input port 1 and a second polarization controller is placed inside the loop. The loop length is much larger than the coherence length of the input light so that the recirculating beams do not interfere with one another. Due to the incoherent addition of the recirculating beams, the output at port 3 is the superposition of different polarization states with different intensities. Depolarization occurs by averaging over the many different polarization states of the recirculating beams. The degree of polarization at output port 3 depends on the input state of polarization, the coupling ratio of the coupler, and the birefringnece of the fiber loop. By properly adjusting the two polarization controllers, polarized light entering input port 1 exits output port 3 unpolarized.

One disadvantage of using a recirculating fiber loop is that the time coherence of the depolarized beam is degraded and therefore may not be suitable for coherent communication systems. In addition, interference noise may arise when the loop length is not sufficiently longer than the coherence length of the input beam. Furthermore, device performance depends strongly on the input signal's coherence length and thus the recirculating fiber loop is not suitable for systems where diversified signal sources are present. Finally, the device may be very bulky due to the long loop length (as long as a few km for DFB lasers).

Due to the disadvantages of prior art methods of depolarizing light described above, improved method of depolarizing light is needed.

SUMMARY OF THE NVENTION

The present invention relates to a method and apparatus of depolarizing or randomizing polarization states of an optical beam. One embodiment of the invention uses a wedged birefringent crystal with its wedge formed by many small steps. Another embodiment of the invention contains many randomly oriented birefringent crystal chips. Different parts of the optical beam passing through the apparatus experience different retardations and exit with different polarization states, resulting a spatially depolarized light beam. Focusing the spatially depolarized beam into an optical fiber results in a depolarized guided wave.

BRIEF DESCRIPTION OF THE DRAWINGS

The advantages of the present invention will become readily apparent to those ordinarily skilled in the art after reviewing the following detailed description and accompanying drawings wherein.

DETAILED DESCRIPTION OF THE INVENTION

Figure 1A:
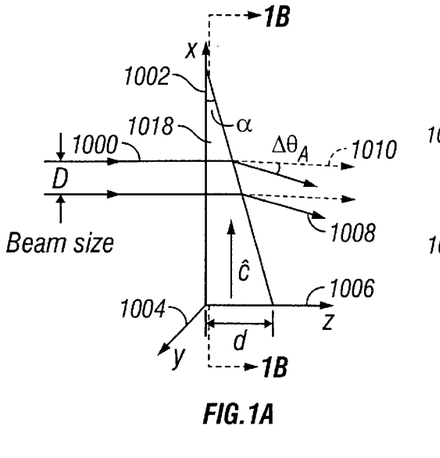
FIG. 1A illustrates a prior art cross section view of a wedged crystal for depolarizing a free space optical beam.
Figure 1B:
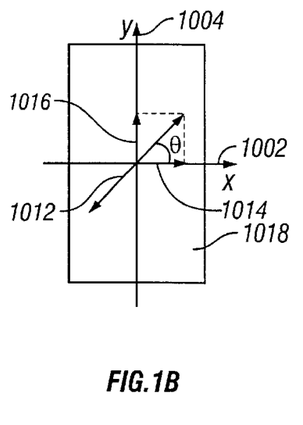
FIG. 1B illustrates the orientation of input beam's polarization with respect to the edges of the wedged crystal.

FIG. 1A illustrate a side cross section view and FIG. 1B illustrate a front view of using a wedged birefringent material 1018 as a spatial depolarizer. Examples of the birefringent material are quartz, calcite, and $YVO_4$. The optical axis (the c axis) of crystal 1080 may be oriented either along x-axis 1002 or along y-axis 1004. In the embodiment illustrated in FIG. 1A and FIG. 1B, the optical axis is oriented along x-axis 1002. A light beam 1000 enters birefringent material 1018 on input surface 1019 and exits the birefringent material 1018 from output surface 1020. Light beam 1000 with a polarization state 1012 propagates along z-axis 1006 and includes an x-polarization component 1014 and a y-polarization component 1016. x-polarization component 1014 experiences a refractive index $n_e$ and y-polarization component 1016 experiences a refractive index of $n_o$. The phase difference between the two polarization components is:

$$\Delta\phi(x) = \frac{2\pi \cdot (n_e - n_o) \cdot x \cdot \tan\alpha}{\lambda} = \frac{2\pi \cdot \Delta n \cdot x \cdot \tan\alpha}{\lambda} \quad (1)$$

where x is the position of an optical ray on the x-coordinate, $\alpha$ is the wedge angle, $\lambda$ is the optical wavelength of the incident light, and $\Delta n$ is the birefringnece of the crystal. When an input polarization is oriented $\theta$ degree from x-axis 1002, as shown in FIG. 1B, the output light field can be expressed as:

$$\vec{E} = E_o e^{i\phi_o}(\hat{x}\cos\theta + \hat{y}\sin\theta \cdot e^{i\Delta\phi(x)}) \quad (2)$$

where $\Delta\phi(x)$ is given in Eq. (1), $E_o$ is the amplitude of the input field, $\phi_o$ is a constant phase, $\hat{x}$ and $\hat{y}$ are the unit vectors of the x-axis and y-axis respectively. When $\theta = 45°$, Eq. (2) becomes:

$$\vec{E} = E_o e^{i\phi_o}(\hat{x} + \hat{y}e^{i\Delta\phi(x)})/\sqrt{2} \quad (3)$$

It is evident from Eq. (3) that optical rays incident at different location along the x axis have different polarization states. For example, for two optical rays with $\Delta\phi = 2m\pi$ and $\Delta\phi = (2m+1)\pi$ (where m is an integer), the corresponding outputs from the depolarizer of FIG. 1A are orthogonally polarized linear polarization states. For two optical rays with $\Delta\phi = (2m \pm \frac{1}{4})\pi$, the corresponding outputs are circularly polarized with opposite sense of rotation, Therefore, birefringent crystal wedge 1018 imparts different polarization states to different portions of an optical beam, resulting in a spatially depolarized beam. By focusing the spatially depolarized light beam into a single mode fiber, we obtain a depolarized guided signal.

For an optical beam with a diameter D, the maximum difference in phase angle $\Delta\phi$ between two rays within the beam is $$\delta_{max} = \max[\Delta\phi(x_1) - \Delta\phi(x_2)] = \frac{2\pi \cdot \Delta n \cdot D \cdot \tan\alpha}{\lambda} \quad (4)$$

In order to completely depolarize light, $\delta_{max}$ preferably equal to or greater than $2\pi$ or $$\Delta n \cdot \tan\alpha \approx \Delta n \cdot \alpha \geq \lambda/D \quad (5)$$

Figure 2:
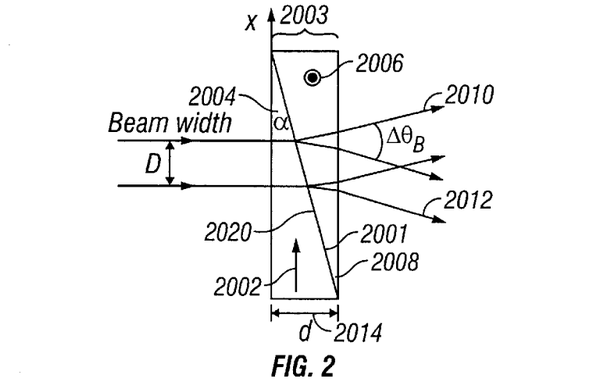
FIG. 2 illustrates a prior art depolarization device with two wedged birefringent crystals cemented together. The beam deviation between two polarization states is also illustrated.

In an alternative arrangement, two wedged birefringent crystals are coupled together to form a composite wedge, as shown in FIG. 2. In the example of FIG. 2, the output surface 2020 of the first birefringent crystal 2004 is coupled to an input surface 2001 of the second wedged birefringent crystal 2008. In FIG. 2, an optical axis 2002 of a first wedge crystal 2004 is oriented 90° from optical axis 2006 of the second wedged crystal 2008. The optical phase difference between a x-polarization component and a y-polarization component of a light ray passing trough the composite wedge is computed using:

$$\Delta\phi(x) = \frac{2\pi \cdot \Delta n}{\lambda}(d - 2x \cdot \tan\alpha) \quad (6)$$

where d is the thickness 2014 of the polarization depolarizer. For an optical beam with a diameter of D, the maximum $\Delta$ difference between two rays within the beam is $$\delta_{max} = \max[\Delta\phi(x_1) - \Delta\phi(x_2)] = \frac{2\pi \cdot \Delta n \cdot 2D \cdot \tan\alpha}{\lambda}, \quad (7)$$

which is twice as that of a single wedge. The condition for complete polarization randomization across the beam is $$\Delta n \cdot \alpha \geq \lambda/2D \quad (8)$$

Thus, in one example, to depolarize an optical beam with a wavelength of 1550 nm and a diameter of 0.5 mm using quartz crystal wedge having a $\Delta n$ of 0.009, the wedge angle $\alpha$ should be larger than 5°.

The single-wedge and composite-wedge depolarizers described above yield an optical beam with spatially randomized polarization states, however, as illustrated in FIG. 1A and FIG. 2, the x-polarization component and the y-polarization component exit the crystal wedge 1018 or 2008 at different angles. The different exit angles result from the different refractive indexes experienced by each polarization component. For example, the angle differences between two polarization components for the cases of FIG. 1A and FIG. 2 respectively are:

$$\Delta\theta_A \approx \Delta n \cdot \alpha/n \quad (9A)$$

$$\Delta\theta_B \approx 2\Delta n \cdot \alpha/n \quad (9B)$$

Where $\alpha$ is the wedge angle, n is the index of refraction of the medium after the crystal, and $\Delta n$ is the difference in refractive index experienced by the x-polarization component and the y-polarization component. Substitutions of Eq.

(9A) in Eq. (7) and Eq. (9B) in Eq. (8) yield an angle deviation of:

$$\Delta\theta_A = \Delta\theta_B \geq \frac{1}{n}\frac{\lambda}{D} \quad (10)$$

Figure 3:
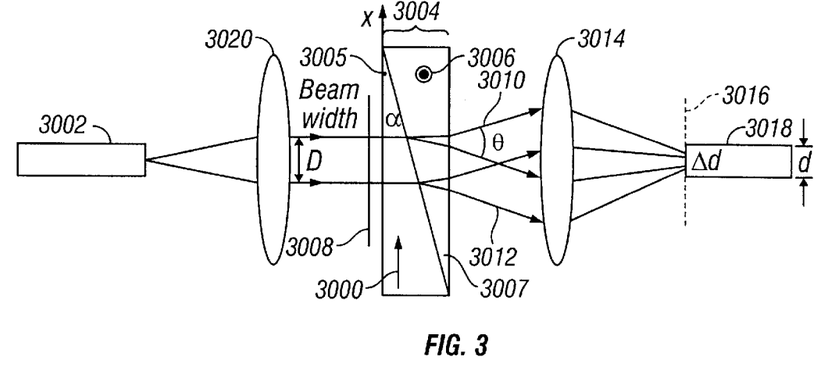
FIG. 3 illustrates a fiber optic in-line depolarizer in which the depolarizing element is wedged birefringent crystal.

The slightly different exit angles may not be a problem for a free space beam with a sufficiently large beam diameter D. However, the different exit angles make it difficult to couple equal quantities of the x- and y-components exiting from the crystal wedge into an optical fiber. Equal quantities of the x and the y polarization components in the fiber produce a truly depolarized beam of light. FIG. 3 illustrates one method of coupling a depolarizer with an input optical fiber 3002 and an output optical fiber 3018. A collimating lens 3020 collimates a light beam from input fiber 3002. The collimated beam passes through a depolarizer 3004. The output of depolarizer 3004 is focused into output fiber 3018 by a focusing lens 3014. Depolarizer 3004 can either be a simple wedge shown in FIG. 1A or a composite wedge shown in FIG. 2. Input fiber 3002 can either be a non-polarization maintaining fiber, a polarization maintaining (PM) fiber, a polarizing (PZ) fiber, or another light source. When a non-polarization maintaining input fiber 3002 is used, a polarization controller may be incorporated to adjust the state of polarization incident on crystal wedge 3005 so that the incident beam polarization is approximately 45° from c-axes 3000, 3006 of crystal wedges 3005, 3007. When input fiber 3002 is a PM fiber, the slow or fast axis of the PM fiber is oriented approximately 45° from the orientation of crystal c-axes 3000 and 3006. An optional polarizer 3008 may be positioned at input side of depolarizer 3004 with its passing axis oriented 45° from c-axes 3000 and 3006. The incorporation of optional polarizer 3008 facilitates alignment of the input polarization to depolarizer 3004 by maximizing power output from depolarizer 3004.

Because the x-polarization component and the y-polarization component exit depolarizer 3004 with slightly different angles, as described in Eq. (9) and Eq. (10), focusing lens 3014 focuses each polarization component to a slightly different location. The resulting lateral difference Δd between two polarization components is illustrated in FIG. 3 and may be expressed as:

$$\Delta d = \Delta\theta \cdot f \geq \frac{1}{n}\frac{\lambda}{D}f \quad (11)$$

where f is the back focal length of the lens. For an output fiber with a numerical aperture of NA, the focal length f satisfies the following relationship for maximum power coupling:

$$D/f \leq NA \quad (12)$$

Substitution of Eq. (12) in Eq. (11) yields:

$$\Delta d \geq \frac{1}{n}\frac{\lambda}{NA} \quad (13)$$

For optimum polarization randomization, both polarization components are focused into fiber 3018. To focus both polarization components into the fiber with minimum loss, Δd is preferably less than the fiber core diameter d. For a standard single mode fiber with NA=0.12 at λ=1.55 um and n=1.5, we obtain from Eq. (13) that Δd≧8.33 um, dose to a typical fiber core diameter of 9 um. Therefore, it is possible to focus both polarization components into a single mode fiber, although the insertion loss may be high.

Figure 4A:
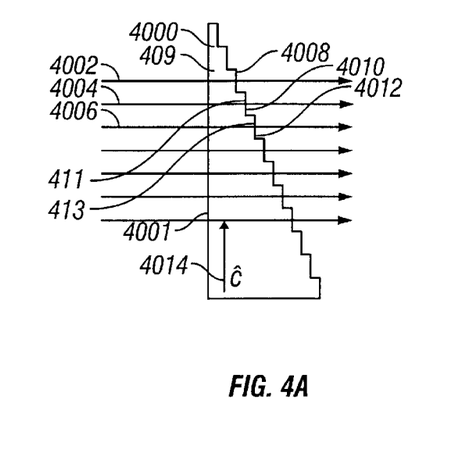
FIG. 4A illustrates one embodiment of the invention for depolarizing an optical beam using a step-wedged birefringent crystal.

FIG. 4A illustrates a depolarizer which eliminates the angle difference Δθ. In the depolarizer of FIG. 4, a birefringent crystal wedge 4000 is formed by many small steps, e.g. steps 4008, 4010, and 4012. Each step includes a subsurface, such as 409, 411, 413, oriented approximately parallel to the input surface 4001 of the birefringent wedge 4000. The normal incidence of each collimated beam portions 4002, 4004, 4006 results in no beam deviation for either the x- or y-polarization components. Within each step, optical rays experience the same amount of birefringent phase difference and thus have the same output polarization state. However, a beam portion 4002, 4004, 4006 in a different step experiences a different amount of birefringent phase difference between the x- and the y-polarization components, resulting in a different output polarization state. Thus each step corresponds to an output polarization state. Because the optical beam covers a sufficient number of steps, the states of polarization are randomized across the beam.

Figure 4B:
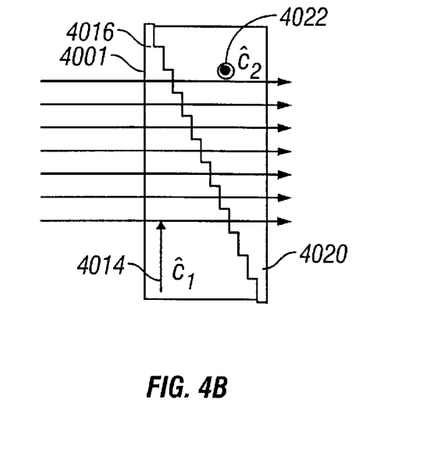
FIG. 4B illustrate another embodiment of the invention consisting of two step-wedged birefringent crystals.

FIG. 4B illustrates another embodiment of the invention in which two stepped birefringent crystal wedges 4016 and 4020 with orthogonal crystal axis orientations 4014 and 4022 are positioned such that an incident beam of light propagates in a direction substantially orthogonal to crystal axis orientations 4014, 4022. One method of maintaining the position of the two crystal wedges 4016 and 4020 is to cement the crystal wedges together with an optical cement having a refractive index dose to that of the crystal.

Figure 4C:
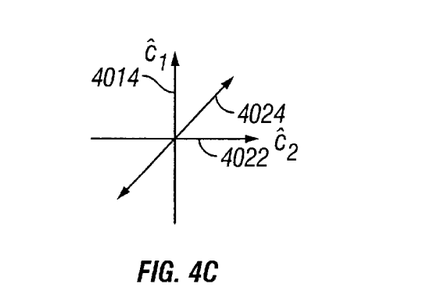
FIG. 4C illustrates polarization directions in the device shown in FIGS. 4A and 4B according to one embodiment.

FIG. 4C illustrates that a preferred polarization state 4024 of an input beam into an input surface of the crystal wedges 4016 and 4020 is linear and oriented 45° from crystal axes 4014 and 4022.

Figure 5:
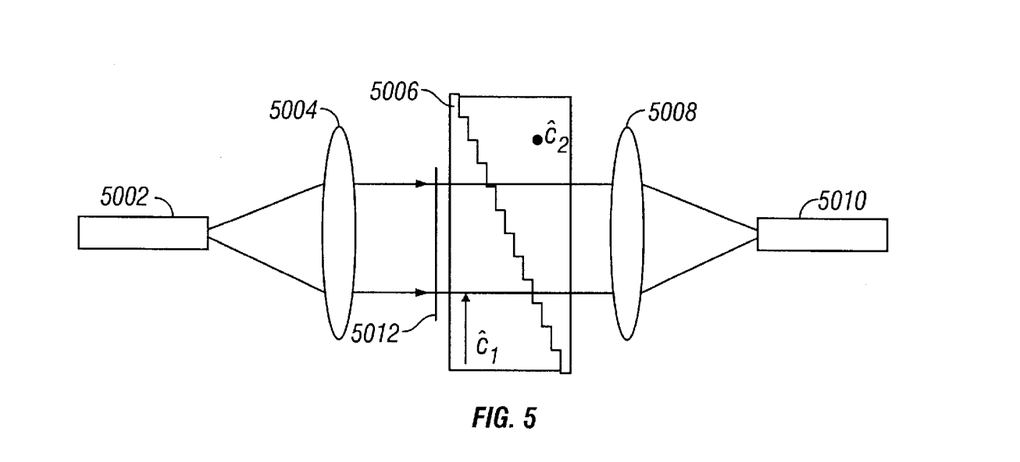
FIG. 5 illustrates an in-line fiber optic depolarizer using a step-wedged optical depolarizer.

FIG. 5 illustrates a fiber optic depolarizer using step crystal wedges in a system described in FIG. 3. The system of FIG. 5 includes an input optical fiber 5002, a collimating lens 5004, a step crystal wedge 5006 (either a single wedge in FIG. 4A or a double wedge shown in FIG. 4B), a focusing lens 5008, and a receiving fiber 5010. An optional polarizer 5012 may be placed at input side of the crystal wedge for aligning polarization state incident onto the wedge. In the illustrated embodiment, the passing axis of polarizer 5012 is oriented 45° from the crystal axes of first crystal wedge 5006 to ensure that the input optical beam is polarized 45° from the crystal optical axes.

Figure 6A:
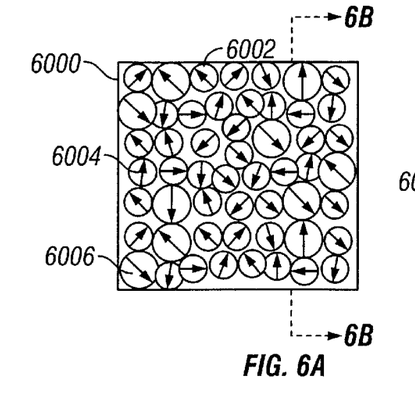
FIG. 6A and FIG. 6B illustrate(s) an apparatus for depolarizing an optical beam using a plurality of randomly oriented birefringent crystal chips.
Figure 6B:
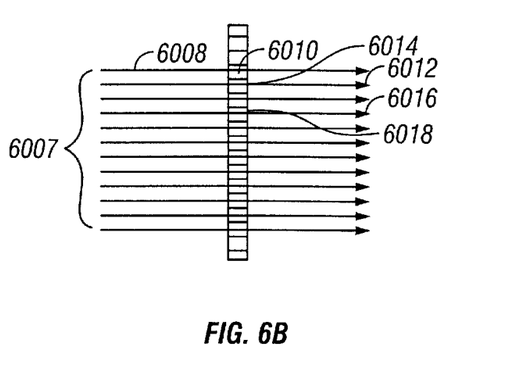

The previously described embodiments are polarization sensitive, thus the performance of the device depends on an input beam's polarization state. However, in some fiber optic applications, polarization insensitive devices are preferred. FIG. 6A illustrates a front view and FIG. 6B illustrates a side view of a polarization insensitive depolarizer 6000. The polarization insensitive depolarizer 6000 includes many randomly oriented micro birefringent crystal chips, e.g. 6002, 6004, 6006. The cross section of the chips can be of arbitrary shape, including circular, square, rectangular, triangular, or a combination thereof. The cross sectional area of each chip is significantly smaller than the beam size (however, not too small to cause scattering). Typically the crystal chips have a cross sectional dimension of approximately 0.1 mm×0.1 mm to depolarize a light beam having a cross sectional dimension of 1 mm×1 mm. The optical axis of each chip is preferably in a plane that is perpendicular to the beam propagation direction.

It can be shown that a quarter wave plate is capable of converting a linear polarization state into any desired polarization state if the relative orientation between the linear polarization state and the optical axis of the plate can be arbitrarily rotated (see Yariv and Yeh, Optical Waves in Crystals, John Wiley & Sons). Therefore in one embodiment, the thickness and birefringnece of each birefringent chip is selected to be a quarter wave plate (either single order or multi-order). As illustrated in FIG. 6B, when a light beam of linear polarization passes through the depolarizer, different beam portions 6008, 6012, 6016 of beam 6007 experience corresponding quarter wave plates 6010, 6014, and 6018, each quarter wave plate oriented in different directions. Consequently, the output polarization states of different parts of the beam are different and are approximately randomized.

One method of fabricating depolarizer 6000 is to sandwich a plurality of mica chips between two glass plates. Optical cement may be used to hold the mica chips and the glass plates together. The refractive index of the optical cement is preferably dose to that of the glass and that of the mica chips. The optical axes of the mica chips may either be randomly oriented or be arranged in such a way that their orientation angles are evenly distributed from 0 to 180 degree.

Figure 7A:
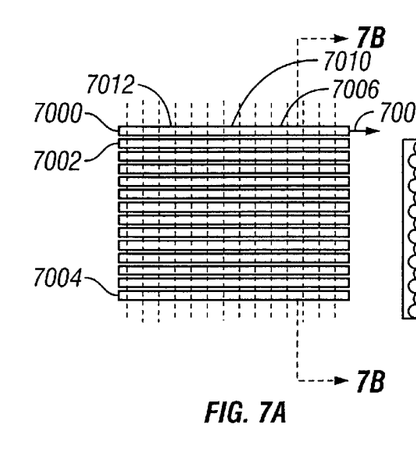
FIG. 7A and FIG. 7B illustrate a method for fabricating a depolarizer with randomly oriented birefringent crystal chips.
Figure 7B:
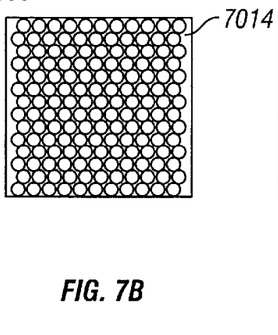
Figure 7C:
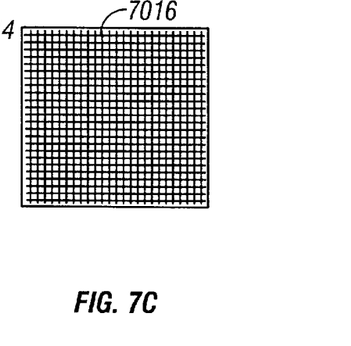
FIG. 7C illustrates an alternative implementation of the device in FIG. 7A where square rods are used.

FIG. 7 illustrates a different method of manufacturing a polarization independent depolarizer. First, many birefringent rods, such as rods 7000, 7002, 7004, are made. The optical axis of each rod is oriented to include a substantial component perpendicular to the rod's longitudinal axis 7008. The birefringent rods are bundled together. The rods are distributed such that the optical axes in a bundle are randomly oriented in a plane or are arranged in such a way that their orientation angles are evenly distributed from 0 to 180 degree. Optical cement may be used to hold the bundle together. In one embodiment, the refractive index of the cement is close to that of the rods. In an alternative embodiment, the optical cement is opaque to prevent light from passing between rods. Prevention of light passing between rods helps preventing the slight bias towards the original input polarization. In an alternative embodiment, when maximum transmittance is desired without having a bias towards the original input polarization, square rods may be bundled together, as illustrated in FIG. 7C. An optional enclosure may be used to confine the bundle and hold the rods together. The bundle of rods illustrated in FIG. 7A is cut into thin slices 7006, 7010, 7012 etc. When the slices are polished, each slice forms a depolarizer with a cross section such as cross sections 7014 or 7016. In one embodiment of the invention, the birefringent rods are birefringent fibers (or polarization maintaining fibers). In an alternative embodiment, the birefringent rods are made of quartz or other birefringent crystals.

Figure 8:
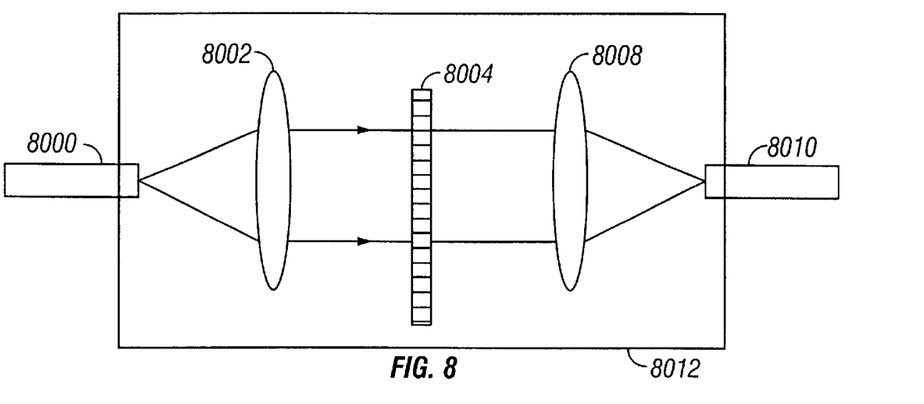
FIG. 8 illustrates a fiber optic in-line depolarizer.

FIG. 8 illustrates the polarization independent depolarizer as used in a fiber optic system. A collimating lens 8002 collimates light from an input fiber 8000. A wave plate 8004 containing many birefringent chips with randomly or evenly distributed crystal axis orientations. A focusing lens 8008 focuses light output by wave plate 8004 into a fiber 8010. Enclosure 8012 holds all the parts together.

Figure 9A:
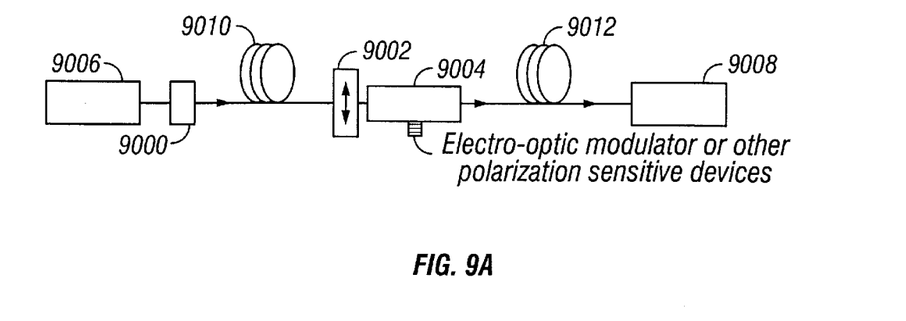
FIG. 9A illustrates using a depolarizer in an externally modulated fiber optic link.

FIG. 9A illustrates using a depolarizer 9000 in a optical fiber communication system. Polarized light from laser 9006 is depolarized by depolarizer 9000 before entering a length of fiber 9010. An optional polarizer 9002 properly polarizes the light output of fiber 1910 before the light enters a polarization sensitive electro-optic modulator 9004. The modulated light from the electro-optic modulator propagates through fiber 9012 before entering receiver 9008. Depolarizing light before fiber 9010 is to prevent polarization fluctuation caused by the fiber. Polarization fluctuation may be converted to amplitude fluctuation by the electro-optic modulator or other polarization sensitive devices in the system and causes transmission error.

Figure 9B:
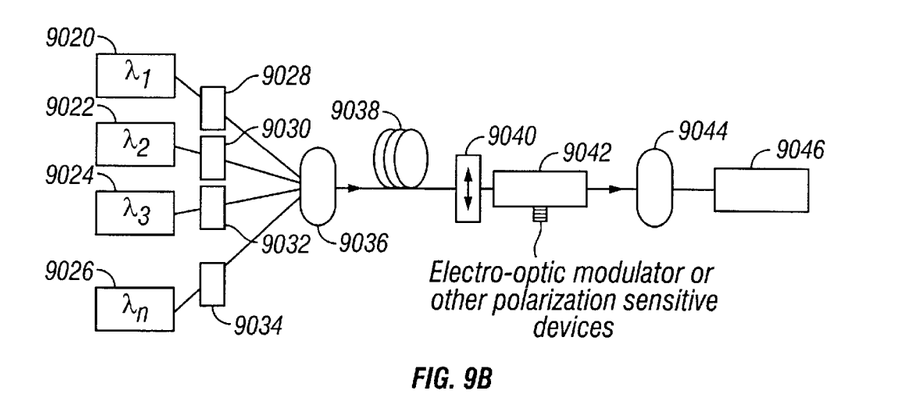
FIG. 9B illustrates using a depolarizer in a wavelength division multiplexing (WDM)system.

FIG. 9B illustrates using depolarizers 9028, 9030, 9032, 9034 in a wavelength division multiplexing (WDM) system. Depolarizers 9028, 9030, 9032, 9034 depolarize light beams with different wavelengths from lasers 9020, 9022, 9024, 9026 respectively. The depolarized light beams are then combined by a wavelength division multiplexer 9036 for input into fiber 9038. A polarization sensitive electro-optic modulator 9042 modulates the received light beams. Light beams with different wavelengths are separated by a wavelength division demultiplexer 9044 and transmitted to a corresponding receiver 9046. An optional polarizer 9040 may be used before electro-optic modulator to convert the depolarized light beams into linearly polarized beams with a proper polarization orientation.

Figure 9C:
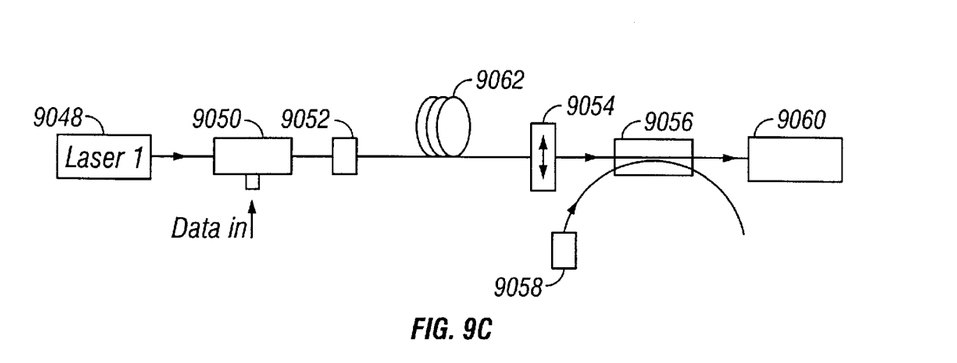
FIG. 9C illustrates use of a depolarizer in a coherent communication system.

FIG. 9C illustrates using a depolarizer 9052 in a coherent heterodyne communication system. Light beam from laser 9048 is modulated by a phase modulator and is then depolarized by depolarizer 9052 before entering a fiber 9062. At the receiver end, the light beam is polarized by an optional polarizer 9054. Coupler 9056 combines the output of polarizer 9054 with a local oscillator light from laser 9058. The optional polarizer 9054 is oriented such that the polarized output light has the same polarization state at coupler 9056 as the light from local oscillator laser 9058. The combined beam is detected by a photodetector 9060.

In the preceding detailed description, various details have been included to facilitate understanding of the invention. However, it is to be understand that the invention is not limited to such details because many alterations, modifications, and variations are within the scope of the teachings contained herein. Accordingly, the invention should not be limited by the preceding examples, but only by the scope of the claims which follow.

What is claimed is:

1. A system to depolarize a beam of polarized light comprising:
   a first birefringent crystal wedge to receive the beam of polarized light at an input first surface, the first birefringent crystal wedge to output spatially depolarized light from an output surface, wherein one of the input and output surfaces of the birefringent crystal wedge includes a plurality of small steps, each step including a subsurface parallel to the other of the input and output surfaces.

2. The system of claim 1 wherein the output surface of the first birefringent crystal wedge includes a plurality of small steps, each step including a subsurface parallel to the input surface.

3. The system of claim 1 wherein the input surface of the first birefringent wedge includes a plurality of small steps, each step including a subsurface parallel to the output surface.

4. The system of claim 2 wherein a height of each step is less than 0.1 mm.

5. The system of claim 1 wherein an optic axis of the first birefringent crystal wedge is oriented perpendicular to the propagation direction of the beam of polarized light.

6. The system of claim 1 further comprising:
   a second birefringent crystal wedge positioned adjacent to the first birefringent crystal wedge, the second birefringent crystal wedge to receive the output of the first birefringent crystal wedge and to further randomize the polarization of light output by the first birefringent crystal wedge.

7. The system of claim 6 wherein the output surface of the first birefringent crystal wedge and an input surface of the second birefringent crystal wedge each include a plurality of steps, each step including a subsurface parallel to the input surface of the first birefringent crystal wedge.

8. A system to depolarize a beam of polarized light comprising:
   an array of birefringent crystal chips arranged to from a plane, each crystal chips having an optic axis oriented such that a substantial component of the optic axis is oriented perpendicular to the propagation direction of the beam of light being depolarized, each chip dimensioned to be substantially smaller than a cross section of the beam of polarized light.

9. The system of claim 8 wherein each birefringent crystal chip is a quarter wave plate.

10. The system of claim 8 wherein the birefringent crystal chips are mounted on a plate of optically transparent material.

11. The system of claim 8 wherein the birefringent crystal chips are made of mica.

12. The system of claim 8 wherein the birefringent crystal chips are formed from cross sections of at least one rod of birefringent material.

13. The system of claim 8 wherein the space between birefringent crystal chips is filled with an optically opaque material.

14. The system of claim 8 wherein the birefringent crystal chips are square in shape, thereby minimizing spacing between adjacent birefringent crystal chips.

15. A system to depolarize light from a fiber comprising:
   a collimating lens to collimate light from a first fiber;
   a depolarizing element having a spatially-varying phase difference along the two orthogonal axes on each light ray across a beam of the collimated light to produce a difference of about $2\pi$ between a first phase difference along the two orthogonal axes of one light ray on one side of the beam and a second phase difference along the two orthogonal axes of another light ray on an opposing side of the beam at the output optical surface to spatially depolarize the collimated light output by the collimating lens; and
   a focusing lens to focus the depolarized output by the depolarizing element into a second fiber segment.

16. The system of claim 15 wherein the depolarizing element is a wedge of a birefringent crystal.

17. The system of claim 16 wherein a first surface of the wedge of the birefringent crystal includes a plurality of small steps, each small step including a subsurface parallel with a second surface of the wedge of the birefringent crystal.

18. The system of claim 17 wherein the depolarizing element further includes a second wedge of birefringent crystal.

19. The system of claim 15 wherein the depolarizing element includes an array of birefringent chips positioned such that the collimated light passes through a significant number of the birefringent crystal chips.

20. The system of claim 17 wherein an optical axis of the wedge of birefringent crystal is perpendicularly oriented to a direction of propagation of the collimated light.

21. The system of claim 16 further comprising a polarizer to polarize the collimated light to a predetermined orientation prior to input into the depolarizing element.

22. The system of claim 21 wherein the polarizer is oriented at an approximately 45° angle to an optical axis of the wedge of birefringent crystal.

23. A device, comprising:
   a birefringent element having an input optical surface and an output surface opposing said input optical surface and configured to have different refractive indices along two mutually orthogonal axes that are substantially parallel to said input optical surface,
   wherein said input and output optical surfaces form an angle with respect to each other to produce different phase delays for different spatial parts of a collimated input optical beam received at said input optical surface to depolarize the collimated input beam, and
   wherein a tangent of said angle is equal to or greater than $\lambda/(\Delta n \cdot D)$, where $\lambda$ is a wavelength of the input optical beam, $\Delta n$ is a difference between said different refractive indices, and D is a cross-sectional dimension of the input optical beam.

24. The device as in claim 23, further comprising an optical polarizer positioned in front of said input optical surface with a polarization direction at about 45 degrees with respect to one of said mutually orthogonal axes.

25. The device as in claim 23, further comprising an input lens positioned to face said input optical surface to collimate light input to said birefringent element and an output lens positioned to face said output optical surface to focus output light from said birefringent element.

26. The device as in claim 23, wherein said birefringent element is formed of a birefringent crystal.

27. A device, comprising:
   a first birefringent element having a first input optical surface and a first output optical surface opposing said first input optical surface with a first angle, and configured to have a first optic axis that is substantially parallel to said first input optical surface, and
   a second birefringent element having a second input optical surface facing said first output optical surface and a second output optical surface opposing said second input optical surface with a second angle, and configured to a second optic axis that is substantially parallel to said second output optical surface and perpendicular to said first optic axis,
   wherein said first and said second angles are selected to produce a difference of about $\pi n$ between phase differences along said two orthogonal axes of two light rays respectively located on two opposite sides of an input beam at said second output optical surface.

28. The device as in claim 27, further comprising an optical polarizer positioned in front of said first input optical surface with a polarization direction at about 45 degrees with respect to one of said mutually orthogonal axes of said first birefringent element.

29. The device as in claim 27, further comprising an input lens positioned to face said first input optical surface to collimate light input to said first birefringent element and an output lens positioned to face said second output optical surface to focus output light from said second birefringent element.

30. The device as in claim 27, wherein at least one of said first and said second birefringent elements is formed of a birefringent crystal.

31. A device, comprising:
   a birefringent element having an input side configured to have an input optical surface and an output side opposing said input side, said output side configured to have a plurality of output optical surfaces substantially parallel to said input optical surface and having different distances from said input optical surface,
   wherein said birefringent element is configured to have an optic axis substantially parallel to said input optical surface to produce different polarizations on different portions of an input beam by different output optical surfaces.

32. The device as in claim 31, wherein two adjacent optical surfaces have a substantially constant difference in distance.

33. The device as in claim 31, wherein a distance from said input optical surface to an optical output surface increases from one side of said output side to t he other side of said output side.

34. The device as in claim 33, wherein a phase difference in said birefringent element between one optical surface with a smallest distance from said input optical surface and one optical surface with a maximum distance from said input optical surface is equal to or greater than $2\pi$.

35. The device as in claim 31, further comprising an optical polarizer positioned in front of said input optical surface with a polarization direction at about 45 degrees with respect to said optic axis.

36. The device as in claim 31, further comprising an input lens positioned to face said input optical surface to collimate light input to said birefringent element an d an output lens positioned to face said output side to focus output light from said birefringent element.

37. The device as in claim 31, further comprising:
a second birefringent element having an output side with an output optical surface and an input side configured to substantially conform to said output side of said birefringent element and have a plurality of input optical surfaces substantially parallel to said input optical surfaces of said output side of said birefringent element, said second birefringent element having an optic axis substantially parallel to said output optical surface and substantially perpendicular to said optic axis of said birefringent element.

38. A device for depolarizing an optical beam, comprising a plurality of birefringent elements arranged to form a plane substantially perpendicular to a direction of an optical beam, each birefringent element having an optic axis with an in-plane component projected in said plane, and orientations of in-plane components of optic axes of said plurality of birefringent elements being either randomly distributed or substantially evenly distributed between 0 degree and 180 degree, wherein each birefringent element is sized to be substantially smaller than a cross section of the optical beam to allow for different birefringent elements in a path of the optical beam to cause different output polarizations in different parts of the cross section of the optical beam.

39. The device as in claim 38, wherein each birefringent element is a birefringent chip oriented to be substantially coplanar with said plane and having its optic axis to be substantially parallel to said plane.

40. The device as in claim 39, wherein each birefringent chip is a quarter-wave plate.

41. The device as in claim 39, further comprising two transparent plates spaced from each other to enclose said plurality of birefringent elements therebetween.

42. The device as in claim 38, further comprising a cement to fix said plurality of birefringent elements relative to one another in said plane.

43. The device as in claim 42, wherein said cement is optically transparent.

44. The device as in claim 43, wherein said cement has a refractive index that is substantially equal to a refractive index of each birefringent element.

45. The device as in claim 42, wherein said cement is optically opaque to block portions of the optical beam that do not pass through birefringent elements.

46. The device as in claim 38, wherein each birefringent element is formed of a birefringent crystal.

47. The device as in claim 38, wherein each birefringent element is formed from a birefringent fiber.

48. The device as in claim 38, further comprising:
a first collimator lens on one side of said plurality of birefringent elements in said plane to collimate the optical beam incident to said plane;
a second collimator lens on an opposite side of said plurality of birefringent elements in said plane to focus the beam passing through said plane;
an input fiber positioned to direct the optical beam to said first collimator lens; and
an output fiber positioned to receive the focused optical beam from said second collimator lens.

49. The device as in claim 31, wherein a distance from said input optical surface to an optical output surface increases from one location of said output side to another location of said output side.

50. The device as in claim 31, wherein a distance from said input optical surface to an optical output surface decreases from one location of said output side to another location of said output side.

51. A device, comprising:
a birefringent element having a first side configured to have a first optical surface and a second side facing away said first side, said second side configured to have a plurality of small optical surfaces substantially parallel to said first optical surface and having different distances from said first optical surface,
wherein said birefringent element is configured to have an optic axis substantially parallel to said first optical surface to produce different polarizations on different portions of an optical beam that transmits said birefringent element through said first and said second sides with a cross section covering at least a portion of said plurality of small optical surfaces.

52. The device as in claim 51, wherein distances between said small optical surfaces and said first optical surface vary from one location on said second side to another location on said second side.

* * * * *